March 25, 1924.

M. R. ANSTICE ET AL
CONTINUOUS BREAD SLICER
Filed Sept. 14, 1922

M. R. ANSTICE ET AL 1,488,307

CONTINUOUS BREAD SLICER

Filed Sept. 14, 1922    7 Sheets-Sheet 4

Inventor
M. R. Anstice,
By G. E. Hazard,
A. J. Patterson Jr.
Attorney

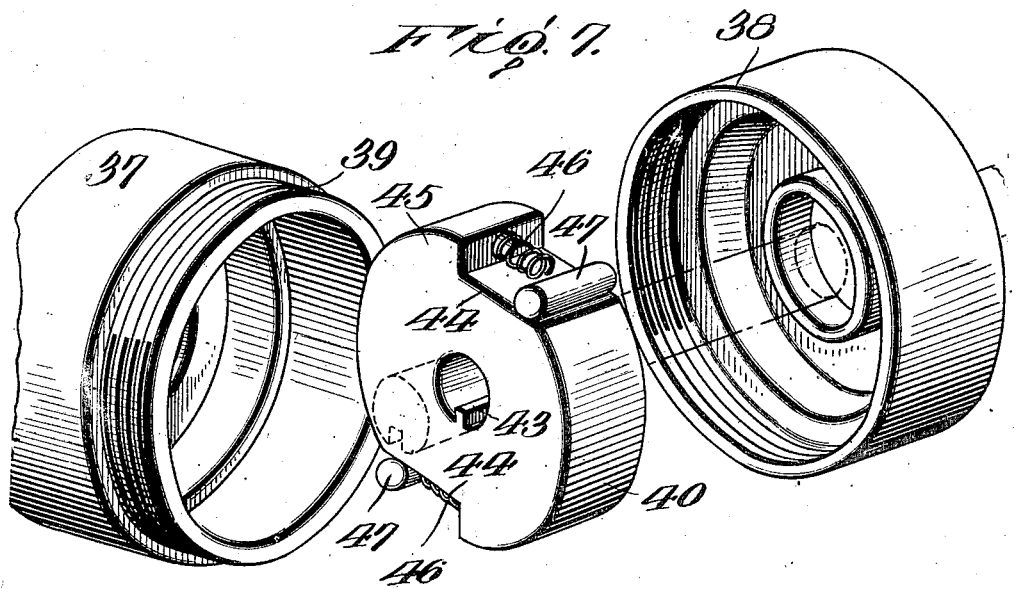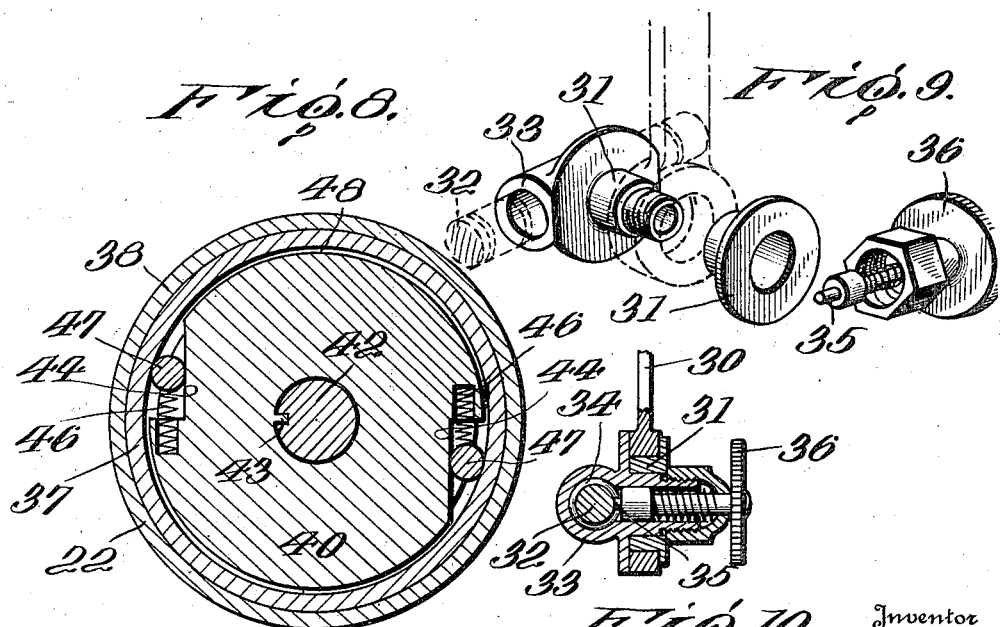

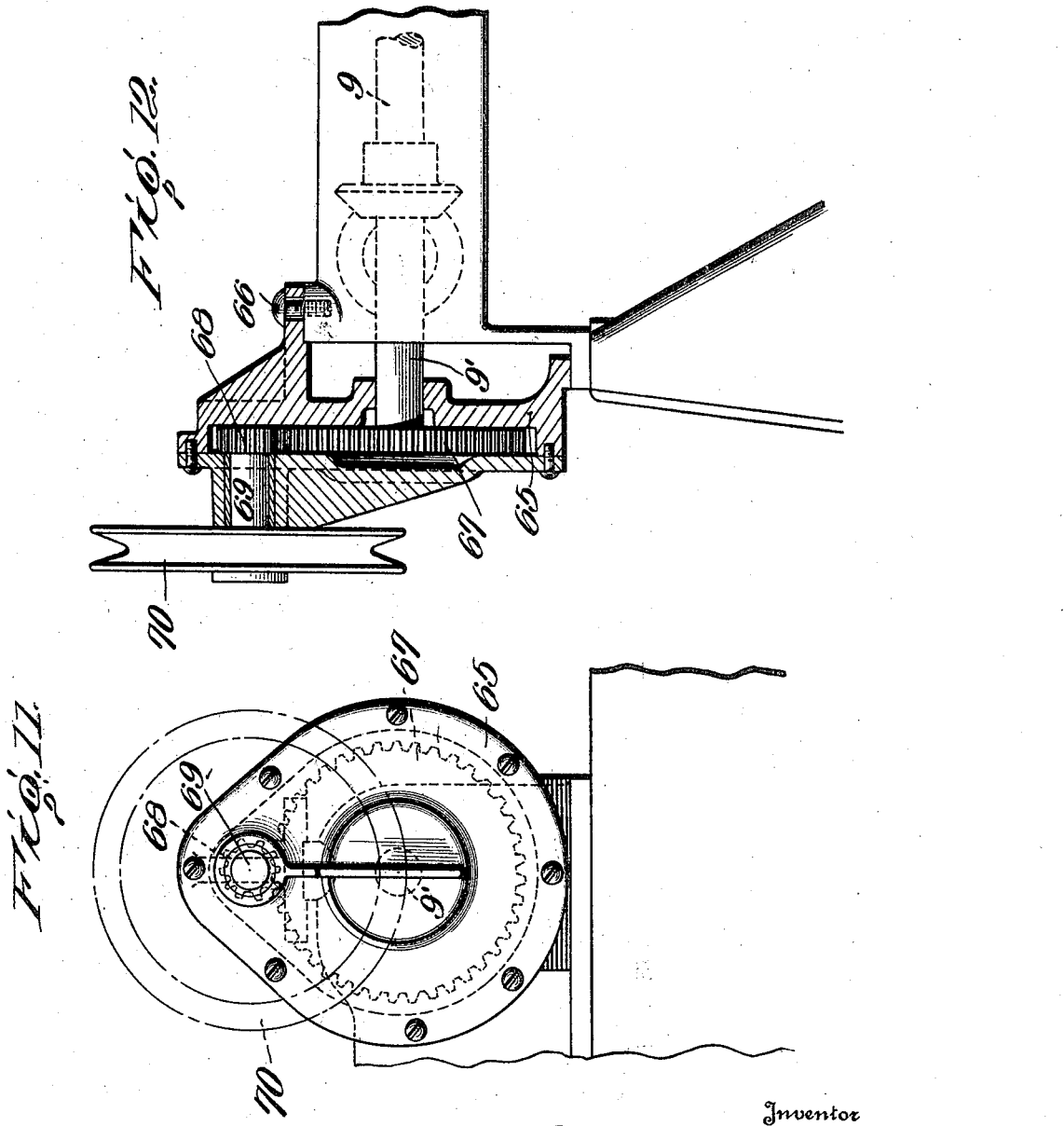

March 25, 1924.  1,488,307

M. R. ANSTICE ET AL

CONTINUOUS BREAD SLICER

Filed Sept. 14, 1922   7 Sheets-Sheet 7

Inventor
M. R. Anstice,
G. E. Hazard,
By A. S. Pattison & Son
Attorney

Patented Mar. 25, 1924.

1,488,307

UNITED STATES PATENT OFFICE.

MORTIMER R. ANSTICE AND GEORGE EDGAR HAZARD, OF ROCHESTER, NEW YORK, ASSIGNORS TO JOSIAH ANSTICE & CO., INC., OF ROCHESTER, NEW YORK, A CORPORATION OF NEW YORK.

CONTINUOUS BREAD SLICER.

Application filed September 14, 1922. Serial No. 588,173.

*To all whom it may concern:*

Be it known that we, MORTIMER R. ANSTICE and GEORGE E. HAZARD, citizens of the United States, residing at Rochester, in the county of Monroe and State of New York, have invented certain new and useful Improvements in Continuous Bread Slicers, of which the following is a specification, reference being had therein to the accompanying drawing.

This invention relates to improvements in continuous bread slicers and it pertains to a construction which is particularly adapted for slicing one loaf after another resulting in increased production.

One object of our present invention is to provide a continuous bread slicing machine in which there is an intermittent travelling belt which is operated by the machine following the cutting operation, whereby the cutting operation is performed while the bread is quiet.

Another object of our present invention is forming the travelling feeding belt of phosphorous bronze whereby it is made very durable.

A further object of my present invention is the particular manner in which the projecting teeth of the belt are formed, whereby they are prevented from breaking.

Another object of our present invention is the particular manner of hinging the ends of the flexible belt whereby they are prevented from pulling apart.

A further object of our present invention is the provision of tension means, whereby the belt is put upon the required tension to properly travel.

Another object of our invention is to provide a clutch for moving the belt which is operated by the mechanism for working the knife.

Another object of our present invention is to provide means whereby the movement of the clutch is adjustable.

Additional objects of the invention will appear from the following description.

In the accompanying drawings:

Fig. 7 is a perspective view of the parts of the clutch shown detached.

Fig. 8 is a sectional view of the clutch for operating the belt.

Fig. 9 is a separated view of the parts which are connected to the clutch operating lever.

Fig. 10 is a sectional view of the parts shown in Fig. 9 shown in their operated relation.

Figs. 11 and 12 shows a modification whereby the machine is operated by a motor.

Figure 1:
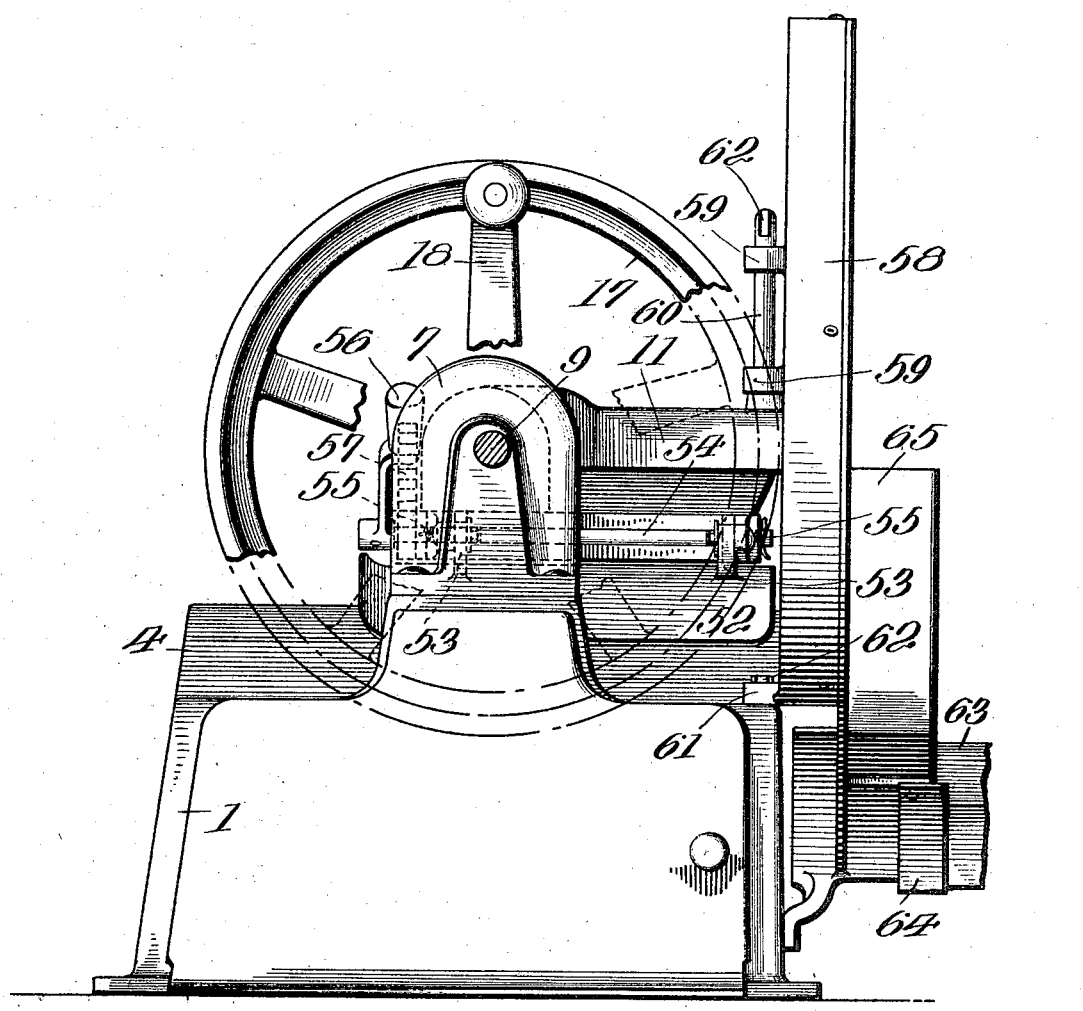
Fig. 1 is a side elevation of our improved continuous slicing machine.
Figure 2:
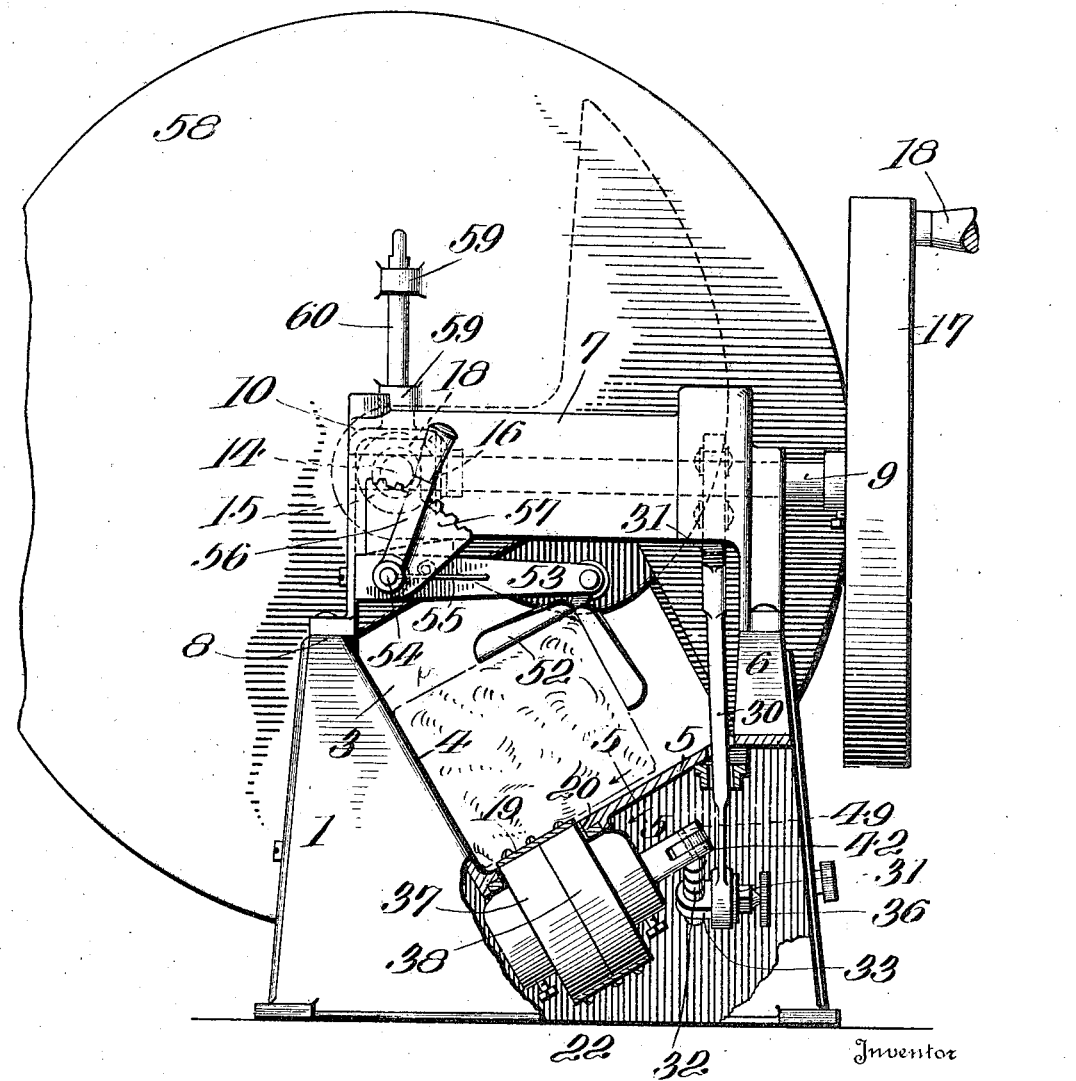
Fig. 2 is an end elevation partly in section of the machine.
Figure 3:
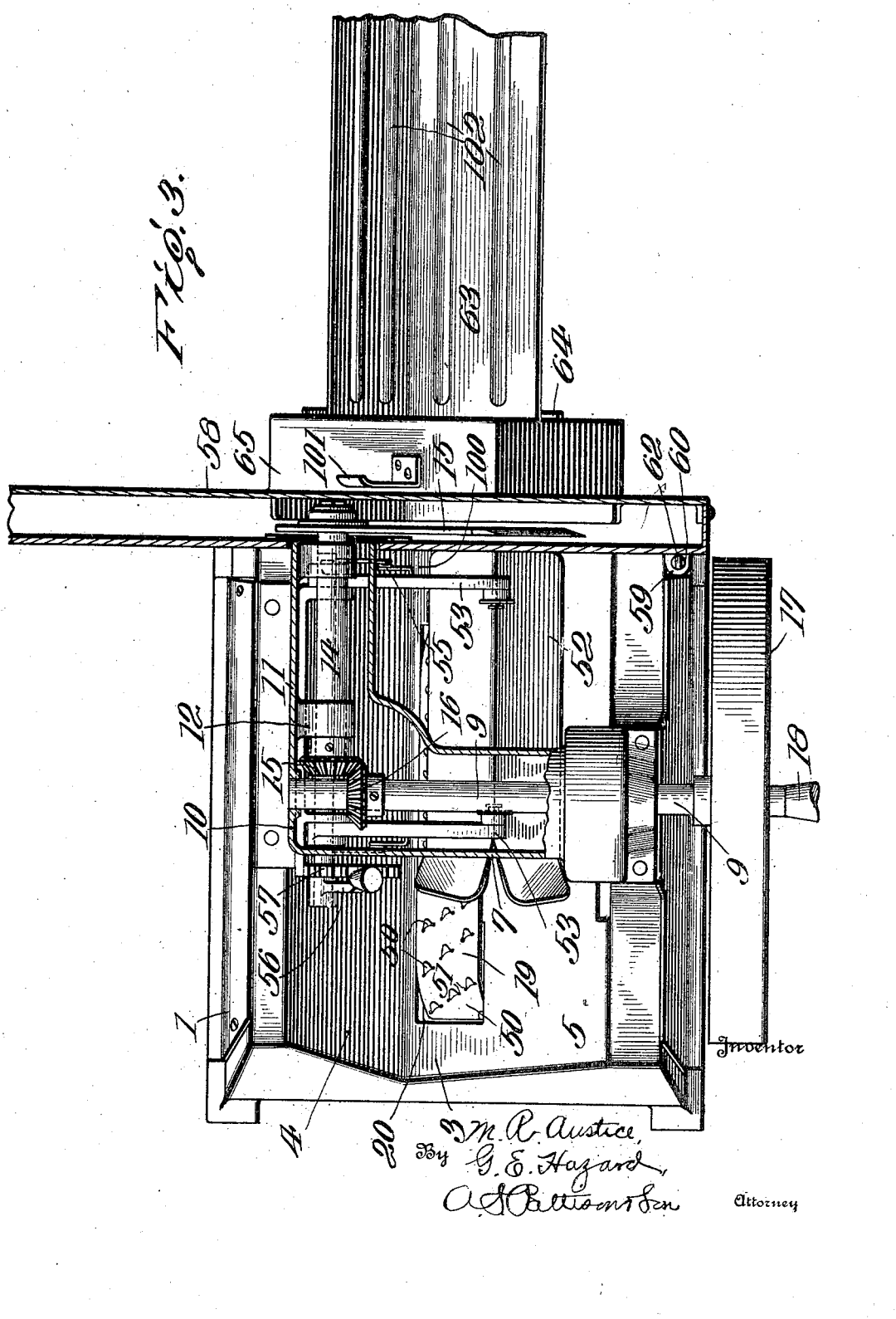
Fig. 3 is a top plan view of the machine partly shown in elevation.
Figure 4:
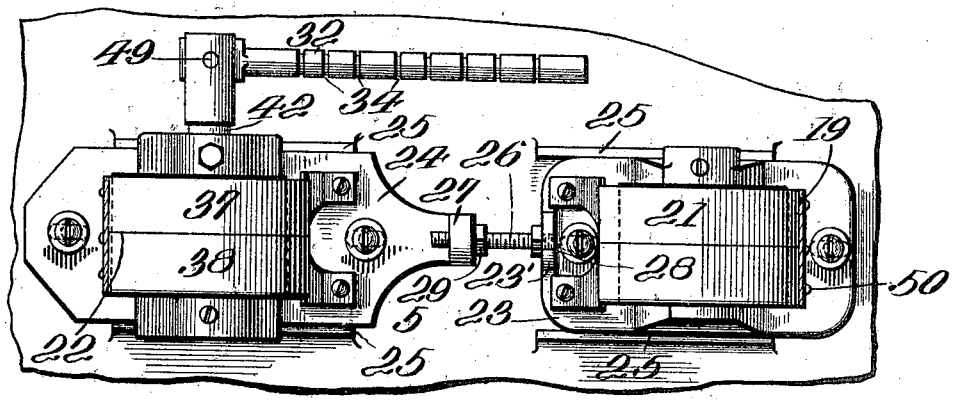
Fig. 4 is a detached inverted plan view of the adjustable pulleys for the belt.
Figure 5:
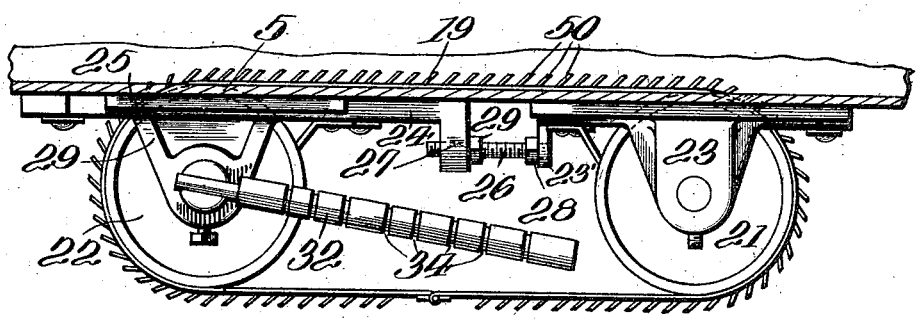
Fig. 5 is a side elevation of the adjustable belt pulleys.
Figure 6:
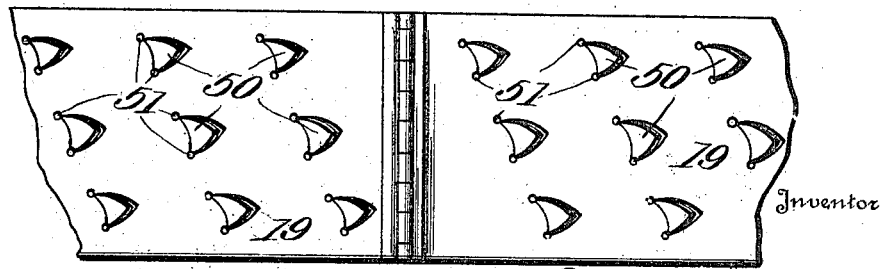
Fig. 6 is a detached plan view of the part of the belt showing the formation of the teeth.
Figure 13:
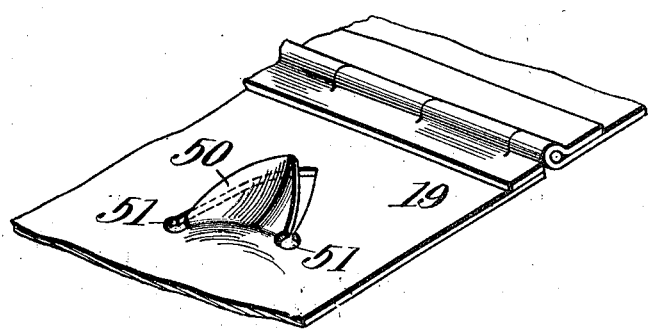
Fig. 13 is an enlarged perspective view of one of the teeth showing its particular concaved formation.
Figures 14, 15:
Figs. 14 and 15 are sectional views through the hinge of the belt at different points showing the manner of forming a doubling over the hinge portion.
Figure 16:
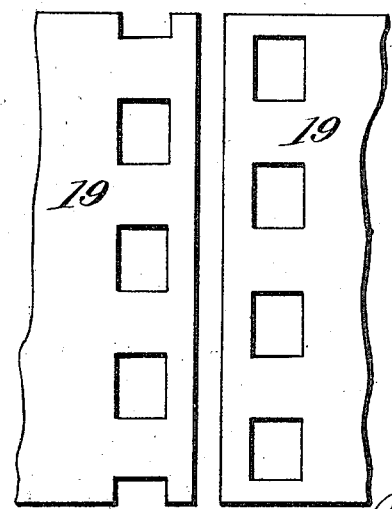
Fig. 16 is a plan view of the belt ends, showing the manner in which they are formed to make the hinge.

Our improved continuous bread slicing machine comprises a base 1 which is elongated as shown in Fig. 2, and the top of the base has an angular indentation 3, which receives the bread that is to be sliced. This angular indentation comprises angular walls 4 and 5 in which the bread to be sliced rests as shown by dotted lines. The outer edge of the wall 5 has a standard 6 projecting upward therefrom, and this standard is provided with a horizontal housing 7 extending across to the upper end 8 of the indentation 4.

A driving shaft 9 has its ends journaled in opposite ends of the housing 7, the shaft housing extending horizontally across the machine. Projecting longitudinal the machine from the end 10 of the housing 7 is a housing 11 which is preferably integral with the housing 7. The housing 11 has bearings 12 and 13 for a knife shaft 14 which projects through the outer end of the housing 11 and carries the knife 15. Attached to the inner end of the shaft 14 is a bevelled gear 15' that meshes with a beveled gear 16 on the shaft 9. On the outer end of the shaft 9 is a fly wheel 17 which carries a handle 18, when the machine is to be operated by hand.

From the foregoing descrpition it will be observed that the shafts 9 and 14 revolve in unison in that the gears 15 and 16 are of the same diameter.

The means for feeding the bread is operated by the shaft 9, which will be presently described. It consists of a continuous belt 19 which passes through openings 20 in the bottom 5 of the indentation 3. This belt passes around the pulleys 21 and 22, these pulleys being journaled in adjustable supports 23 and 24. These supports lock with a slide between guideways 25, the adjustment being accomplished by a screw 26 which has one end extending into the support 23 at 23′ and its other end screwed into a depending lug 27 of the support 24. A head 28 of the screw 26 serves as a means for extending the two supports 23 and 24 and a lock nut 29 serves to lock the parts in their adjusted positions. The correct operation of the belt 19 is necessary and hence it is required to be very tight.

The belt is moved by the shaft 9 through the intervention of a lever 30 which is reciprocated by an eccentric 31 on the shaft 9. The lower end of the lever 30 is journaled on a stud 31′ which has its opposite end adjustable upon a rod 32, which latter rod is operatively connected with a clutch to be presently described. The connection 31 includes a member having an opening 33 which receives the rod 32, and the rod 32 has a plurality of notches 34 with which a spring hand operated projection 35 engages. The projection 35 is operated by a knob 36 that can be pulled outward and when released will engage one of the notches on the rod 32.

The form of clutch here shown for operating the pulley 22 is shown in Figs. 7 and 8. The pulley 22 comprises a housing made in two parts 37 and 38 which are provided with screw-threads 39 for screwing them together. Located within these two parts 37 and 38 is a clutch member 40 that is keyed to the shaft 42 as shown at 43. The clutch member 40 is provided with two cut away portions 44 which cut away portions extend tangentially. The walls 45 of the cut away portions 44 are provided with weak springs 46 that engage the rollers 47 and force them outward in contact with the inner wall 48 of the housing composing the parts 37 and 38. This arrangement of clutch is not new, but it permits the clutch to rotate freely in one direction but positively locks with the members 37 and 38 when turned in the opposite direction. We prefer to use this type of clutch though we desire it to be understood that other types may be used, as in fact, a small ratchet which however would be noisy.

Now referring to Fig. 2 it will be observed that the movement imparted to the belt 19 is controlled by the location of the member 33 on the rod 32 and that the position of the member 33 is controlled in the manner before explained. Attention is directed to the fact that the rod 32 is pivotally connected to the shaft 42 at 49 so that its reciprocating movement may be free and unimpeded.

Referring now to the particular construction of the belt 19, it is provided with upwardly struck teeth 50, which are preferably though not necessarily placed on an angle as shown in the accompanying drawings. We find that we can prevent the teeth being torn from the belt by drilling the belt at the juncture of the tooth with the body of the belt as at 51. This prevents the tooth from breaking off, which we find would occur without these drilled openings. Each tooth is pointed as shown and concaved in their upper surface as clearly shown. When formed as constructed they form efficient means for forcing the bread forward for the cutting of the slices.

We found considerable trouble in finding an adequate hinge for the ends of the belt. This was finally found by making the belt as shown with the ends turned over in opposite directions to form a hinge and then the pivot rod passed through the turned over parts, the turned over parts being soldered to the belt simply for holding them in position. We find that a hinge of this character is very strong and serves the purpose well.

For the purpose of holding the loaf in position upon the belt we provide a holding member 52 which is triangular in shape. This member is pivoted upon arms 53 which are loosely pivoted upon a shaft 54 passing through the housing and below the shaft 14, and is spring held by means of springs 55 which have their outer ends connected with levers and their inner ends passing through the shaft 54. A lever 56 is rigidly attached to the outer end of the shaft 54 and has an ordinary spring detent (not shown) that engages a toothed member 57. By means of this construction the member 52 can be raised and lowered and the desired tension placed upon the loaf of bread as illustrated in Fig. 2.

For the purpose of protecting persons from the cutting knife 15 we provide a housing 58 extending across the outlet end of the machine. This housing has eyes 59 which receive a standard 60 from the housing 11 and at its lower end a lug 61 receives a projection 62 extending from the base of the machine. An angular trough 63 has its inner end inserted in a loop 64 which is formed on the bottom of the flange 65. This angular trough 63 serves to receive the slices of the bread as they are pushed forward during the operation of the machine.

If it is desired to operate the machine by motor the shaft 9 has its end 9' passing through a housing 65, which housing is provided for the purpose and is attached to the machine by a screw 66. The end of the shaft 9' carries a gear wheel 67 that meshes with a pinion 68 carried on the shaft 69, the latter shaft carrying a suitable pulley 70. A belt (not shown) passes around this pulley and will pass to an electric or other motor pulley (not shown).

By means of a construction such as is here described loaves of bread may be fed through the machine one after another, the cut slices accumulating on the trough 63, when they are removed. The operation of the machine would be continuous as will be readily understood.

We wish to direct attention to the fact that the important feature of the machine is the V-shaped trough 63. In most bread slicing machines it is necessary to hold the bread against the sides of the trough, as well as to feed it up an even predetermined distance as each slice is cut. With our V-shaped trough, the bread is held on two sides by its own weight and it is unnecessary to have any mechanism to hold the bread against the side of the trough.

The bread holding member 52, which is adjustable, above the trough is there for the purpose of holding the last part of the loaf down, because it will be found in running a loaf of bread through the machine that as the knife gets near the end of the loaf there is a tendency for the knife, in striking the corner of the loaf, to tip up the last end of the loaf a little. This bread holding member 52, while not designed to press against the bread firmly, is designed with a special spring attachment at each end so that it steadies the bread and at the same time permits for the unevenness in the loaves as they pass under it without binding, which would intereferes with the forward travel of the bread.

Attention is directed to the fact that the last part of the loaf is not moved forward by the endless belt 19. This is purposely so arranged, because there is not enough bearing surface at the bottom of the loaf to keep the last end of it upright when the bread is being sliced. We therefore leave the last part of the loaf to be pushed forward across the space 100 by the next following loaf in the machine.

We wish also to call attention to the simplicity of the stacking trough 63, which is easily attached to the machine through the medium of the member 64. When the machine is not in use, in order to save storage space, the trough 63 can be removed and set upon the knife-guard and there held in place by the spring clip 101.

Attention is also directed to the beads 102 on both sides of the trough 63. These beads do away with what would otherwise amount to much friction of the cut slices of bread on the trough, these slices depending of course, on the loaves behind to push them forward.

Referring now to the endless belt 19, we wish to call attention to the fact that the small holes 51, at each side of the base of the tooth 50, are very important. These holes are punched or drilled before the tooth is turned up, which prevents the fracture of the metal, as it has been found that to turn the tooth up without first drilling or punching the hole will fracture the metal of the belt and that it is only a matter of time before these fractures connect and the belt is broken, because of the wearing or weaving motion it has in running over the pulleys. It is also important to stagger the position of the teeth so that as the belt rolls over the pulleys, the weaker parts of the belt caused by the teeth opening therein are not all in one line. We have also found in practice that it is better to have the teeth a little less than perpendicular to the belt as they will then get a better grip upon the bread crusts and feed the loaves more evenly.

Attention is also directed to the fact that the power drive is applied at right angles to the swing of the knife. This is important, because our knife could not be a continuous cutter, if the drive were at one end, unless the distance from the knife to the drive was unreasonable, that is to say, sufficient in distance to allow the dropping of the longest loaf of bread procurable into the trough 3.

We desire it to be understood that the construction of the machine may be varied without departing from the spirit and scope of our invention.

Having thus described our invention, what we claim and desire to secure by Letters Patent is:

1. A continuously operating slicing machine comprising a base having a depression, a belt below one wall of said depression and extending through the same, a shaft extending longitudinally of the base and carrying at one end a revolving knife movable across one end of the depression, an operating shaft extending transversely the base having one end operatively connected with the knife shaft to revolve it in unison with the operating shaft, and a reciprocating operating member connecting the transversely arranged shaft with the belt to move it after the knife has passed the end of the depression.

2. A slicing machine comprising a base having an angular depression, an intermittently travelling belt in one wall of the depression, a housing extending transverse and above the said depression, a driving shaft journaled in the said housing, means operatively connected with the driving shaft for intermittently moving the belt, and a knife travelling across the depression operatively connected with the driving shaft.

3. A slicing machine comprising a base having a depression, a travelling belt in one wall of the depression, a driving shaft extending transverse the depression and above it, a knife intermittently moving across the end of the depression and operated by the driving shaft, and means connected with the driving shaft for intermittently moving the belt when the knife has passed the end of the depression.

4. A slicing machine comprising a base having a depression, an intermittently movable belt in one wall of the depression, a driving shaft operatively connected with the belt for moving it intermittently, a knife operatively connected with the driving shaft and intermittently movable across the depression, and a pivotally mounted hold-down member for engaging a loaf of bread and holding it in contact with the belt.

5. A slicing machine comprising a base having a belt intermittently movable on one wall of the depression, of an L-shaped housing located above the depression, an operating shaft extending transverse the depression, a knife shaft extending through the other leg of the L-shaped housing, the said shafts carrying gears of equal diameters, means for intermittently moving the belt and connected with the driving shaft, for the purpose described.

6. A slicing machine comprising a base, a traveling belt in one wall of the base, a driving shaft extending transversely of the base and above it, a knife intermittently moving across the end of the base and operated by the driving shaft, and means connected with the driving shaft for intermittently moving the belt when the knife has passed the end of the base.

7. A slicing machine comprising a base having a belt intermittently movable on one wall of a depression therein, an operating shaft extending transverse the depression, a knife-shaft extending longitudinally of the depression, the said shafts operatively connected, and means operatively connected with the operating shaft and the belt for intermittently moving the belt.

8. A slicing machine comprising a base having an angular depression, one wall of the depression having openings, pulleys under the said wall, a belt passing through the openings and around the said pulleys, one of the said pulleys carrying means for intermittently moving it, a rod extending from said intermittently movable means, an operating shaft extending transverse the depression and above it, and reciprocating means connecting the said shaft, the lower end of said means adjustable upon the said rod for the purpose described.

9. A slicing machine comprising a base, a traveling belt in one wall of the base, a driving shaft extending transverse the base and above it, a knife intermittently moving across the end of the base and operated by the driving shaft, means connected with the driving shaft for intermittently moving the belt when the knife has passed the end of the base, and means connected with the driving shaft whereby the same can be electrically driven.

10. A slicing machine comprising a base, a traveling belt in one wall of the base, a driving shaft extending transversely the base and above it, a knife intermittently moving across the end of the base and operated by the driving shaft, and means comprising a one-way clutch connected with the driving shaft for intermittently moving the belt when the knife has passed the end of the base.

11. A slicing machine comprising a base, a traveling belt in one wall of the base, a knife, a driving shaft for the knife, means for intermittently moving the belt, a rod extending from said intermittently movable means, a reciprocating means connecting the driving shaft and rod of the said intermittently movable means, and the lower end of the said reciprocating means adjustable upon the rod, for the purpose described.

12. A slicing machine comprising a base, having a belt movable in one wall thereof, pulleys below the said wall for carrying the belt, guide-ways in said wall for supporting the pulleys, and an adjustable connection between the pulleys, whereby they may be moved to or from each other.

13. A slicing machine comprising a base, a traveling belt in one wall of the base, a knife, a driving shaft for the knife, means connected with the driving shaft for intermittently moving the belt, and the connecting means between the driving shaft and the belt adjustable, whereby the distance the belt travels at each movement can be controlled.

In testimony whereof we hereunto affix our signatures.

MORTIMER R. ANSTICE.
GEORGE EDGAR HAZARD.